(12) United States Patent
Bluhm et al.

(10) Patent No.: US 10,994,190 B2
(45) Date of Patent: May 4, 2021

(54) BATTERY AND OTHER IMPROVEMENTS FOR A PERSONAL TRANSPORTATION VEHICLE

(71) Applicant: Neutron Holdings, Inc., San Francisco, CA (US)

(72) Inventors: Jason Bluhm, San Francisco, CA (US); Mark Frykman, Mountain View, CA (US); Barrett Heyneman, San Jose, CA (US); John Ulmen, Emerald Hills, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 246 days.

(21) Appl. No.: 16/142,299

(22) Filed: Sep. 26, 2018

(65) Prior Publication Data

US 2019/0091552 A1 Mar. 28, 2019

Related U.S. Application Data

(60) Provisional application No. 62/563,551, filed on Sep. 26, 2017.

(51) Int. Cl.
*A63C 17/12* (2006.01)
*A63C 17/01* (2006.01)
(Continued)

(52) U.S. Cl.
CPC ........ *A63C 17/017* (2013.01); *A63C 17/0006* (2013.01); *A63C 17/01* (2013.01); *A63C 17/012* (2013.01); *A63C 17/015* (2013.01); *A63C 17/12* (2013.01); *A63C 17/26* (2013.01); *A63C 19/065* (2013.01); *B60L 50/66* (2019.02); *B60L 58/20* (2019.02); *H01M 2/1083* (2013.01); *A45F 3/04* (2013.01); *A63C 2019/067* (2013.01); *A63C 2203/12* (2013.01); *A63C 2203/14* (2013.01); *A63C 2203/22* (2013.01);
(Continued)

(58) Field of Classification Search
CPC ........ A63C 17/01; A63C 17/017; A63C 17/12
See application file for complete search history.

(56) References Cited

U.S. PATENT DOCUMENTS

D670,419 S 11/2012 Fissell
D670,696 S 11/2012 Cobbett et al.
(Continued)

FOREIGN PATENT DOCUMENTS

CN 202923418 U 5/2013
EP 0870641 A 10/1998
WO 2014152951 A1 9/2014

*Primary Examiner* — Brian L Swenson
(74) *Attorney, Agent, or Firm* — Dentons US LLP

(57) ABSTRACT

Methods and apparatus are discussed for an electric powered personal transportation vehicle with electric motors powered by one or more batteries. A battery pack storage enclosure i) contains a set of pocket cores. The first battery pack storage enclosure has a rigid internal structure that has a set of pocket cores that hold the battery cells in place and ii) contains a metal mid-plate that functionally transfers thermal heat rapidly through a metal mass of the metal mid-plate to smooth out spikes of local temperatures when an initial battery cell overheats and fails in order to minimize the heat from the initial battery cell failure from propagating and causing a neighboring battery cell to also fail from the heat.

20 Claims, 12 Drawing Sheets

(51) Int. Cl.
  *B60L 58/20* (2019.01)
  *B60L 50/60* (2019.01)
  *A63C 19/06* (2006.01)
  *H01M 2/10* (2006.01)
  *A63C 17/00* (2006.01)
  *A63C 17/26* (2006.01)
  *B32B 17/06* (2006.01)
  *B32B 5/24* (2006.01)
  *A45F 3/04* (2006.01)

(52) U.S. Cl.
  CPC ...... *A63C 2203/24* (2013.01); *A63C 2203/42* (2013.01); *B32B 5/245* (2013.01); *B32B 17/062* (2013.01); *B32B 17/064* (2013.01); *B32B 17/066* (2013.01); *H01M 2220/20* (2013.01)

(56) References Cited

U.S. PATENT DOCUMENTS

| | | | |
|---|---|---|---|
| D685,419 S | 7/2013 | Ahmad et al. | |
| D688,245 S | 8/2013 | Guerra | |
| D688,664 S | 8/2013 | Guerra | |
| 9,266,445 B2 | 2/2016 | Dastoor et al. | |
| 9,399,406 B2 | 7/2016 | Dastoor et al. | |
| 10,343,052 B2* | 7/2019 | Wood | B60L 50/20 |
| 10,384,556 B1* | 8/2019 | Miyata | B62J 99/00 |
| 2005/0139406 A1* | 6/2005 | McLeese | A63C 17/04 180/180 |
| 2013/0081891 A1 | 4/2013 | Ulmen et al. | |
| 2014/0196968 A1* | 7/2014 | Bieler | B62M 6/65 180/181 |
| 2014/0277888 A1 | 9/2014 | Dastoor et al. | |
| 2016/0072161 A1* | 3/2016 | Nubbe | H01M 10/643 429/62 |
| 2016/0121756 A1 | 5/2016 | Dastoor et al. | |
| 2016/0184690 A1* | 6/2016 | Aders | A63C 17/012 180/20 |
| 2016/0256767 A1* | 9/2016 | Cerboneschi | A63C 17/017 |
| 2016/0296826 A1* | 10/2016 | Belcher | A63C 17/12 |
| 2016/0303997 A1 | 10/2016 | Dastoor et al. | |
| 2017/0252638 A1 | 9/2017 | Ulmen et al. | |
| 2017/0259697 A1 | 9/2017 | Dastoor et al. | |
| 2018/0111038 A1* | 4/2018 | Green | A63C 17/223 |
| 2020/0238158 A1* | 7/2020 | Han | A63C 17/01 |

\* cited by examiner

BATTERY AND OTHER IMPROVEMENTS FOR A PERSONAL TRANSPORTATION VEHICLE

RELATED APPLICATIONS

This patent application claims priority to and benefit under 35 USC 119 to U.S. Provisional Patent Application No. 62/563,551, filed Sep. 26, 2017, titled "An electric personal transportation vehicle with various improvements," which is hereby incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to an electric-powered personal transportation vehicle, such as an electric-powered personal transportation vehicle, having an improved battery.

BACKGROUND

People need a better mechanism and supporting system to move around safely without the vulnerabilities of traditional vehicles.

SUMMARY

Provided herein are some embodiments. In an embodiment, the design is directed to an electric personal transportation vehicle, a mobile application, and a backend cloud platform to support this system.

Methods and apparatus are discussed for a battery pack storage enclosure i) that contains a set of pocket cores. The battery pack storage enclosure has a rigid internal structure that has a set of pocket cores that hold the battery cells in place and ii) contains a metal mid-plate that functionally transfers thermal heat rapidly through a metal mass of the metal mid-plate to smooth out spikes of local temperatures when an initial battery cell overheats and fails in order to minimize the heat from the initial battery cell failure from propagating and causing a neighboring battery cell to also fail from the heat.

These and other features of the design provided herein can be better understood with reference to the drawings, description, and claims, all of which form the disclosure of this patent application.

DRAWINGS

The drawings refer to some embodiments of the design provided herein in which.

Figure 1:
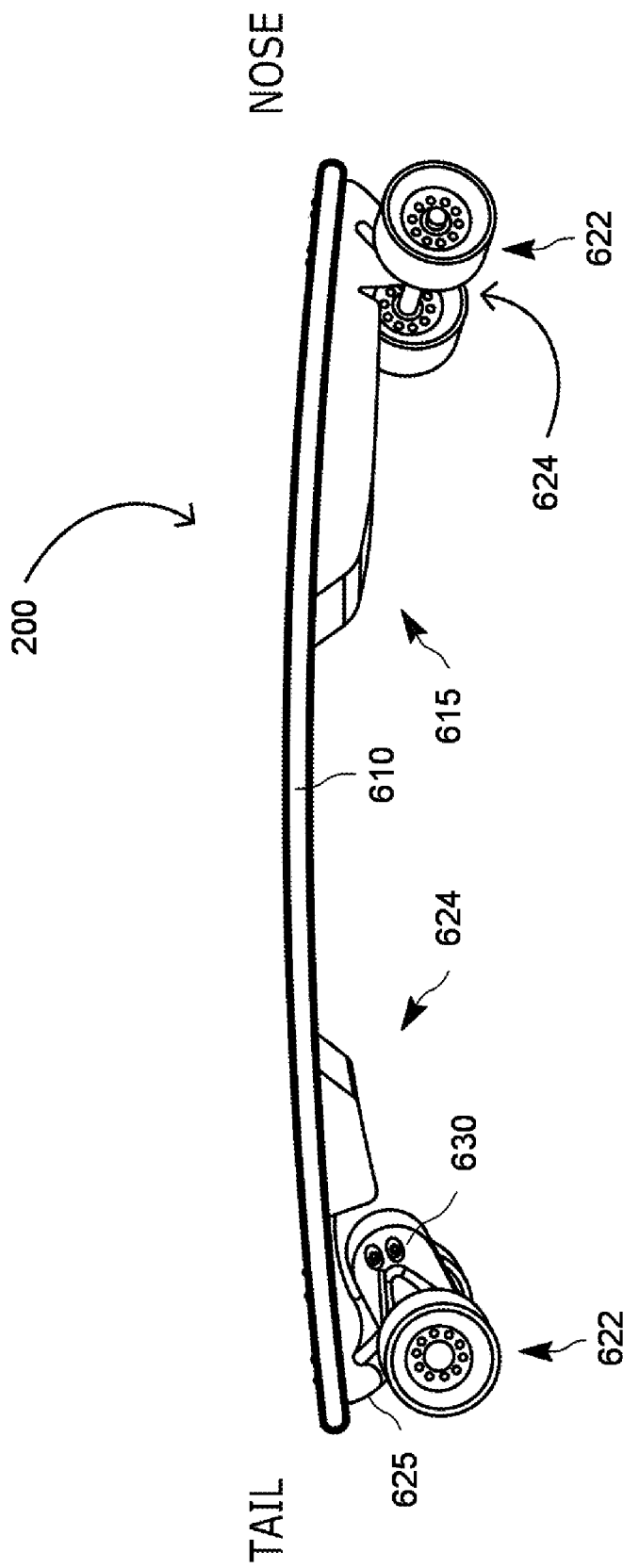
FIG. 1 illustrates an example embodiment of an electric-powered personal transportation vehicle that includes a deck, one or more wheels, and one or more electric motors mounted to a drive truck.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of electrical circuits in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered skateboard, can be made. However, the specific numeric reference should not be interpreted as a literal sequential order but rather interpreted that the first electric-powered skateboard is different than a second electric-powered skateboard. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the design is directed to an electric personal transportation vehicle, such as i) an electric-powered skateboard, ii) an electric-powered scooter, iii) an electric-powered wheelchair, and iv) other personal transportation vehicles.

The electric-powered personal transportation vehicle, such as an electric-powered skateboard, has many features and some example features will be discussed below. In general, an embodiment discussing an electric-powered skateboard will be discussed as an example embodiment. In general, the battery pack storage enclosure has improvements such as containing i) a set of pocket cores and ii) a metal mid-plate that functionally transfer thermal heat rapidly through a metal mass of the metal mid-plate to smooth out spikes of local temperatures when an initial battery cell overheats and fails.

FIG. 1 illustrates an example embodiment of an electric-powered electric personal transportation vehicle that includes a composite board, one or more wheels and one or more electric motors mounted to a drive truck. The electric-powered personal transportation vehicle 200, such as a skateboard illustrated here, may include a composite board 610, one or more wheels 622, one or more electric motors 630 mounted to a first drive truck 625 of one or more trucks 624, and one or more batteries 615 to power the one or more electric motors 630. For example, a pair of trucks 624 are mounted to a bottom of the composite board 610, and each truck of the pair of trucks includes an axle. The one or more batteries 615 power the electric motor 630, which is configured to drive the wheels by way of a drive system. The composite board 610 is configured to support a rider's weight while standing on the composite board 610 and operating an electric-powered personal transportation vehicle 200.

A drive truck 625 supports one or more wheels. The electric motor(s) is configured to drive the wheels. The drive truck 625 is mounted to the composite board 610 at either a front (or nose) of the composite board 610 or a back (or tail) or the composite board 610. The drive truck 625 is mounted to the composite board at the front and back of the composite board in FIG. 1. One or more batteries 615 within one or more enclosures eventually mount to the composite board 610 behind the front truck 624 or in front of the rear truck 625. For example, the battery 615 is mounted to the composite board within a battery enclosure behind the front truck in FIG. 1. In addition, the batteries 615 may mount to a bottom surface of the composite board 610 or within a compartment within the composite board 610. The internal portions of the composite board 610 itself may be the battery enclosure, with no need for a secondary battery enclosure. The one or more batteries 615 supply power to the electric motor or motor 630, electric light or lights, and other electronic equipment including various sensors. One or more processors and various software routines are configured to control the operation of the electric motor(s), light(s), sensor(s), etc.

Figure 2:
FIG. 2 illustrates an example embodiment of an electric-powered personal transportation vehicle that includes a deck, and a weight of a rider being supported by the deck, truck, and wheels.

FIG. 2 illustrates an example embodiment of an electric-powered electric personal transportation vehicle that includes a deck, and a weight of a rider being supported by the deck, truck, and wheels. In this example electric personal transportation vehicle 200, the rider may change the angles of the composite board by shifting their weight on the composite board and/or via commands given through the wireless remote. Changing the balance of the rider's weight may be used as a control input for steering and/or acceleration and/or braking.

The electric-powered electric personal transportation vehicle 200 may be controlled by a wireless remote. The wireless remote may be a stand-alone hand-held device (as shown) or in an embodiment a suitably programmed mobile computing device typically running a software application resident on that mobile computing device. In an example embodiment, the mobile computing device may be a smart phone, a smart watch, a tablet computer, etc. The mobile computing device may include a wireless transmitter, such as a radio antenna, for wirelessly communicating with the electric personal transportation vehicle. The wireless remote may use one or more antenna and/or transmission frequency to provide signals to the electric-powered electric personal transportation vehicle. Communication may be one way, two way, or networked among multiple devices communicating together with each other and/or with the electric-powered electric personal transportation vehicle 200.

The wireless remote puts the power over the board's operation in of the palm of the rider's hand. The wireless remote is configured to control the acceleration and deceleration of the electric-powered electric personal transportation vehicle from a fast or slow acceleration to quick or gentle braking. The high performance, Bluetooth-enabled wireless remote acts as a safe, secure link between the rider and the board. The remote may or may not use the Bluetooth protocol for transmission. Any variety of wireless transmission protocols may be acceptable for transmission of signals to and from the electric-powered electric personal transportation vehicle.

Figure 3:
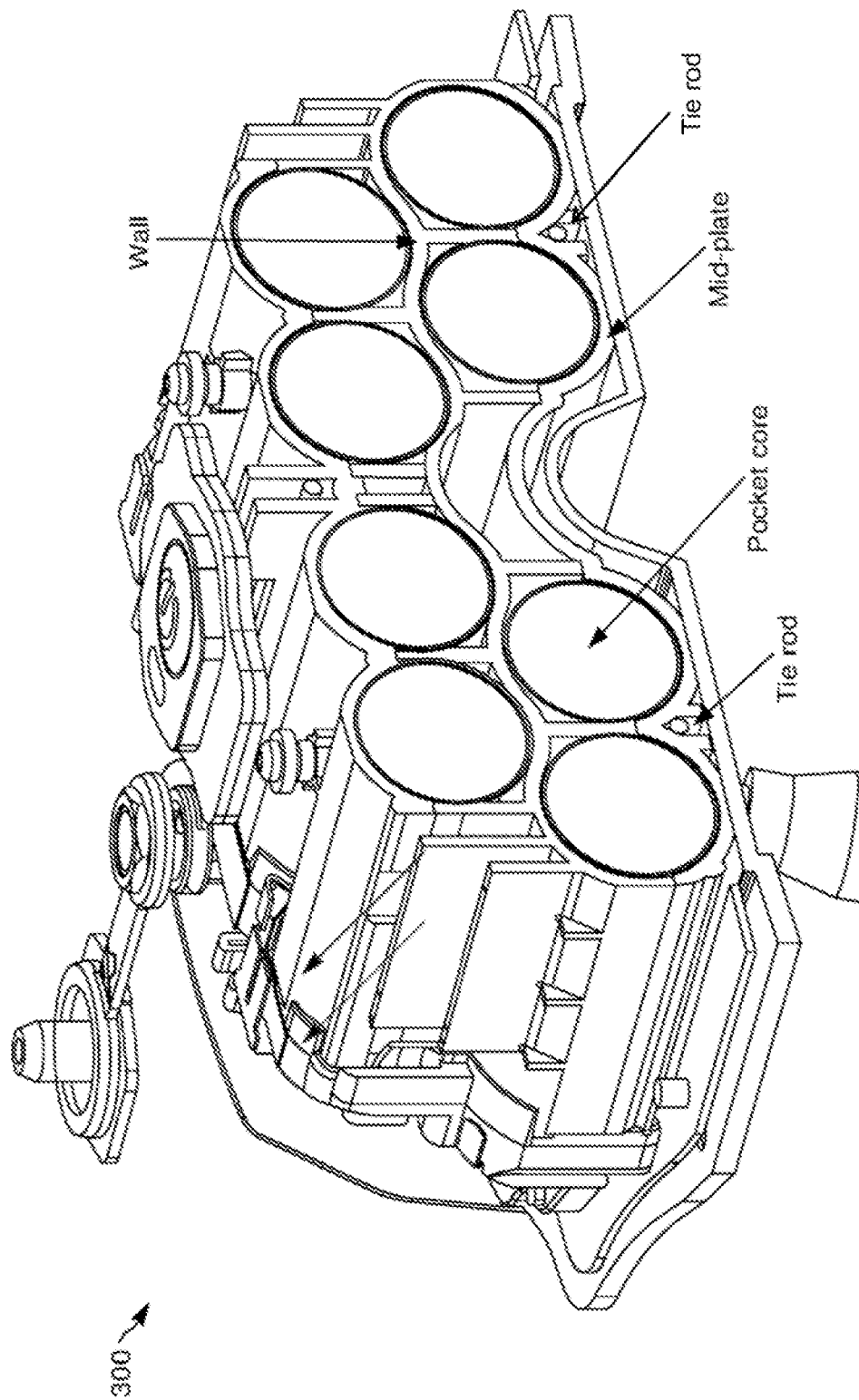
FIG. 3 illustrates an example embodiment of a battery pack storage enclosure that contains a set of pocket cores and has a rigid internal structure.

FIG. 3 illustrates an example embodiment of a battery pack storage enclosure that contains a set of pocket cores and has a rigid internal structure.

Each pocket core may be shaped to match the battery cell it is design to contain. Each pocket core is connected in a series of pockets to form the battery pack storage enclosure 300 for the battery cell pack. The example battery pack has six circular shaped pocket cores.

Each pocket core of the battery pack storage enclosure 300 can be made of high strength glass filled nylon to absorb impact, and a die cast aluminum metal mid-plate to thermally conduct heat rapidly. The battery pack storage enclosure 300 may alternatively contain a set of metal, such as Aluminum, pockets/cores that hold the battery cells in place.

The main batteries may use an anti-propagation technique. The main batteries may use thermal insulating wraps combined with thermally conductive heat distribution elements to prevent a thermal failure of a single cell from propagating to other cells in a battery pack. This improves pack safety. Thus, the battery pack may use the thermally conductive heat distribution elements to prevent propagation of a thermal fault from one cell to another cell.

The battery pack storage enclosure 300 has a rigid internal structure that has a set of pocket cores that hold the battery cells in place. The battery pack storage enclosure 300 contains a metal mid-plate that functionally transfers thermal heat rapidly through a metal mass of the metal mid-plate to smooth out spikes of local temperatures when an initial battery cell overheats and fails in order to minimize the heat from the initial battery cell failure from propagating and causing a neighboring battery cell to also fail from the heat.

Pieces of the pocket core can use i) aluminum or ii) other light-weight thermally conductive metal, (e.g. a thermal conductivity of, for example, 230 W/m/K) to spread heat from a venting battery cell evenly throughout the pack rather than localized heating, which damages a neighboring cell.

The battery pack storage enclosure 300 also may contain multiple metal walls inserted into a structure of the battery pack storage enclosure 300. The battery pack storage enclosure 300 contains multiple metal walls, each metal wall abutting in between neighboring pocket cores. The metal wall prevents sideways thermal heating from directly overheating neighbor battery cells and functionally transferring thermal heat rapidly through a metal mass of that metal wall to smooth out spikes of local temperatures when an initial battery cell overheats.

Venting & Propagation Safeguards

The battery internals are specifically designed to prevent propagation and contain thermal energy should ignition occur. For example, the battery enclosure may use the metal walls, the metal mid-plates, as well as blow out covers, insulation wrappers, etc. as a countermeasure against the ignition problem for battery cells. The system interprets "ignition" as referring to battery cell venting or thermal runaway.

The system has a battery pack to address foreseeable ignition causes, to include certain abuse cases. Thus, as a safeguard against potential battery cell venting and thermal runaway instances, the battery pack storage enclosure 300 accounts for both thermal conduction and heat transfer to protect against potential propagation of battery failure to a neighboring battery cell. The battery pack storage enclosure 300 that contains a set of metal walls and mid-plates that safeguard against propagation battery cell failures when an initial battery cell vents. A second battery cell is then prevented from failing through functionally transferring the local thermal heat from the initial battery failure rapidly through the metal mass to smooth out spikes of local temperatures when an initial battery cell overheats or fails.

Due to the short time interval between the initial battery cell failure and propagation of subsequent battery cell failures, the leading theory is that the second battery cell failed from direct contact with the vent gas and instantaneous heating from the initial battery cell failure, which is what is being mitigated by the design.

Superheated gas from a battery cell failure cannot vent sideways into a neighbor battery cell. The battery pack storage enclosure 300 contains a set of pockets/cores with metal mid-plates and walls that hold the battery cells in place and prevent heating up merely neighboring cells during a venting.

As discussed, the battery pack storage enclosure 300 contains a set of pockets/cores that insert metal walls or other barriers at narrowest points between cells to prevent sideways venting from directly overheating neighbor cells.

The anti-propagation protection for the battery cells further includes use of insulation wrappers and using individual blow out buttons/covers on each battery cell. The insulation wrapper, such as fire resistant tape, vulcanized paper, etc., wraps around each of the battery cells to limit neighbor to neighbor heating. Thus, each battery cell may have an insulation wrapper wrapping around that battery cell to limit a heat transfer rate between the pocket core holding that battery cell and the battery cell itself. The thermal insulating material in the wrapper provides for safety via being either a heatsink or insulation in order to prevent a catastrophic failure of one battery cell to another cell. The insulation wrapper limits the heat transfer rate between the pocket housing and the battery cell, which allows the heat from a defective battery cell to more evenly disperse intense heat from a neighboring venting battery cell throughout the entire structure rather than locally rapidly heating merely a neighboring cell. The heat transfers at a slower rate and allows more time for the heat to propagate throughout the entire structure. Thus, the entire battery pack storage enclosure 300 including the metal mid plates, the metal walls, and the multiple pocket cores each with its own battery cell making up the battery pack storage enclosure 300 over the extended time evenly disperse the intense heat from the venting gases throughout; rather than, locally rapidly transferring that intense heat from one venting battery cell to merely its neighbor battery cell and then that intense local heat damaging its neighboring battery cell.

Note, if the battery cells are spaced far enough away from each other than local venting temperatures and other thermal concerns are essentially mitigated. However, when a small form factor is desired between neighboring cells, then thermal issues and need for a metal structure is advantageous.

Figure 4:
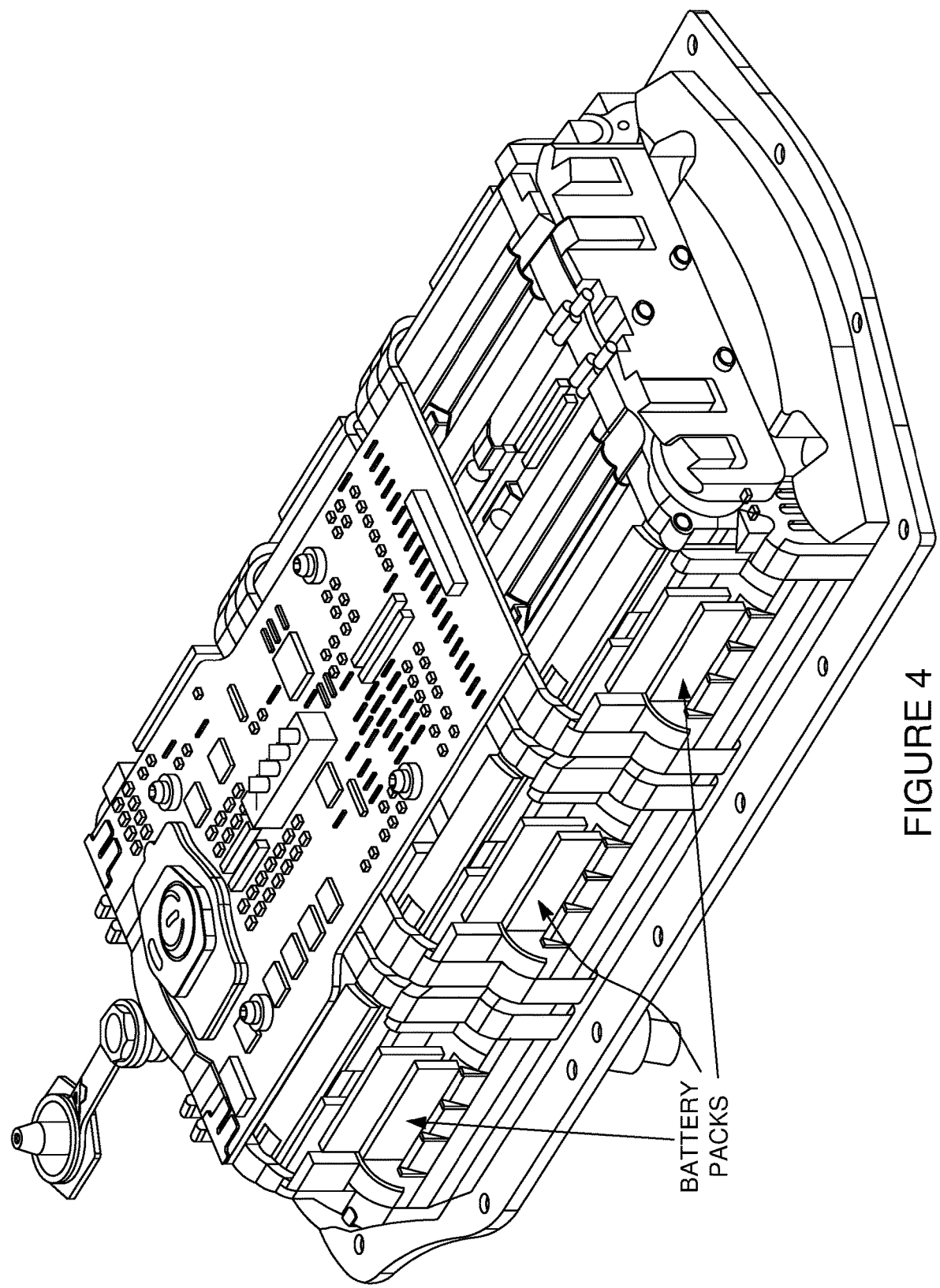
FIG. 4 illustrates an example embodiment of three battery packs tied together to form a battery module with the longitudinal tie rods.
Figure 5:
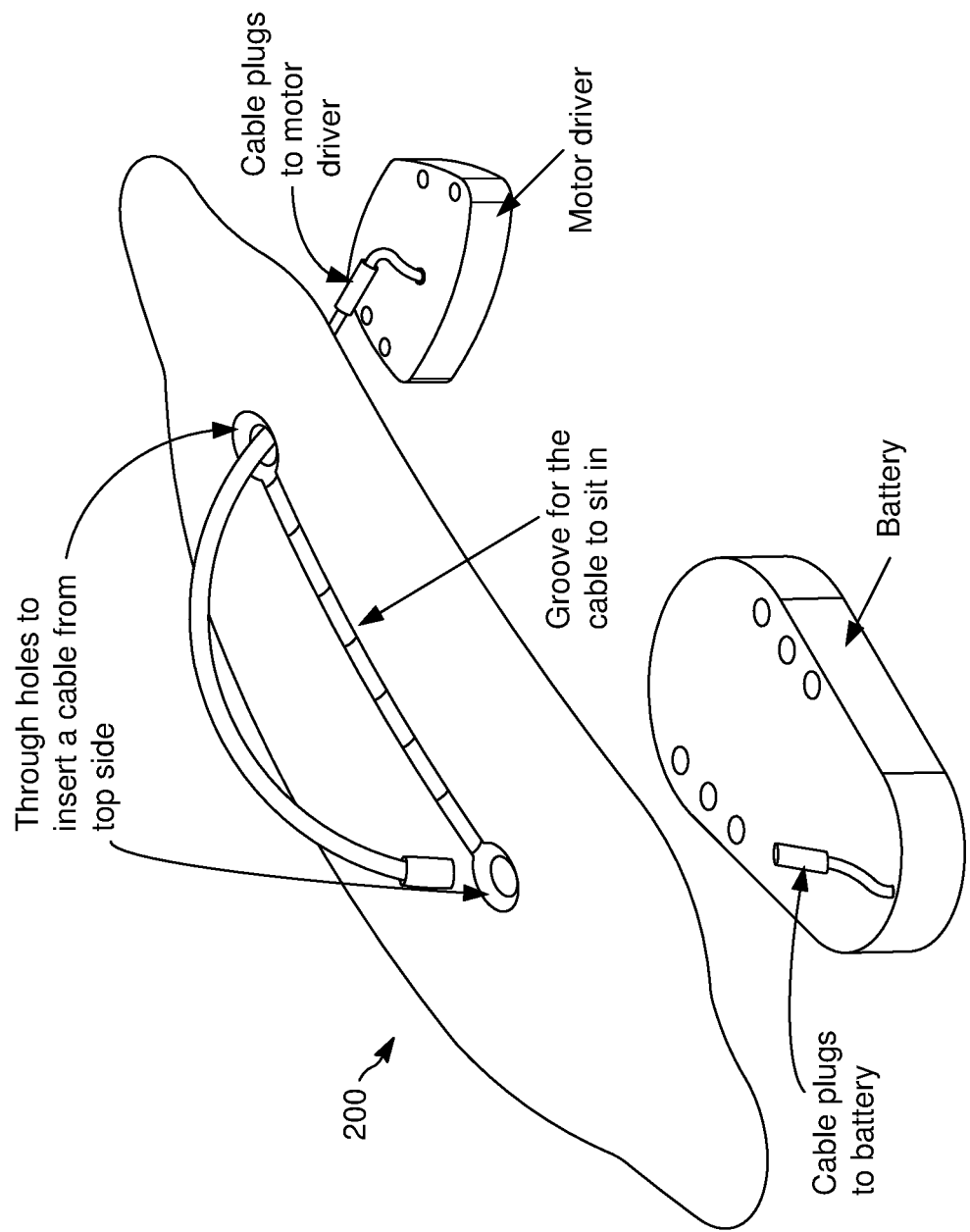
FIG. 5 illustrates an embodiment of a battery housing containing one or more battery modules coupling physically and electrically with an embodiment of the personal transportation vehicle.

Next, the battery pack storage enclosure 300 also contains two or more longitudinal tie rods, such as the three example tie rods illustrated. Two or more longitudinal tie rods (or other tensioning mechanism) run through the battery pack storage enclosure 300 to increase core pack rigidity to improve the vibration and shock resistance for the battery. The longitudinal tie rods ties multiple groups of battery cells into a rigid battery pack. The longitudinal tie rods carry the moment loads and hold the multiple groups of battery cells joined as a module tightly together. See FIG. 4 illustrating an example embodiment of three battery packs tied together to form a battery module with the longitudinal tie rods. See FIG. 5 illustrating an embodiment of a battery housing containing one or more battery modules coupling physically and electrically with an embodiment of the personal transportation vehicle.

Figure 6:
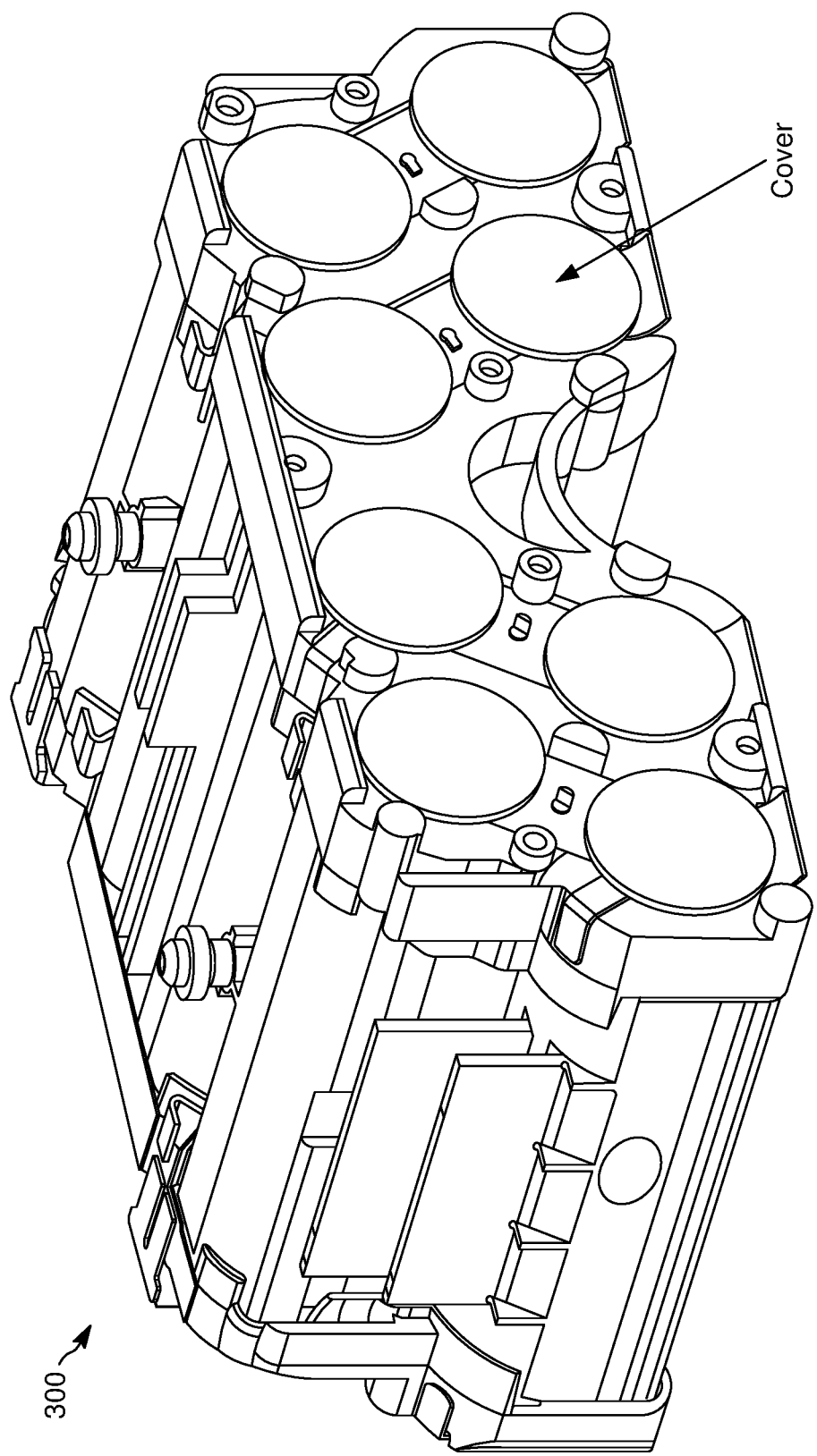
FIG. 6 illustrates an example embodiment of a battery pack storage enclosure that contains a set of pocket cores with one or more blowout buttons/covers.

FIG. 6 illustrates an example embodiment of a battery pack storage enclosure that contains a set of pocket cores with one or more blowout buttons/covers.

Each of the pocket cores may have one or more blowout buttons/covers on that pocket core containing the battery cell. The battery pack storage enclosure 300 contains a set of metal pockets/cores that hold the battery cells in place and use individual blow out buttons/covers on each battery cell to limit the exposed ends from overheating due to venting gas from a neighboring battery cell. The individual blow out covers keep out water, moisture, dirt, etc. from the housed battery cell in that pocket core; and, if a an overheating failure occurs on that battery cell, then the blowout cover for that battery cell allows hot vent gases to exit the overheating battery cell and minimally affect neighboring battery cells. The other individual blow out covers remain on their pocket cores to cause the vent gases to minimally affect neighboring battery cells. The remaining blowout covers shield the other pocket cores from the hot vent gases from the overheating battery cell.

Vibration and Shock Resistance for the Battery

Each of the pocket cores has a battery cell with soft glue that holds the battery cell in place in the pocket core. The battery pack storage enclosure 300 with i) its cavities in the pocket cores filled with battery cells and soft glue, ii) the metal mid-plates, and iii) metal walls form a rigid structure 1) resistant to vibration effects from anticipated operation of the person transportation vehicle as well as 2) resistant to sudden impact shocks to the structure from being dropped and/or a sudden stopping of the person transportation vehicle when a crash occurs, where the use of soft glue assists in absorbing vibrational energy and momentum energy while holding the battery cell in place.

The battery pack storage enclosure 300 contains a set of pocket cores with metal mid-plates and walls that hold the battery cells in place in order to improve reliability and safety in other ways as well.

The battery pack storage enclosure 300 contains a set of pocket cores with metal mid-plates and walls that addresses "the sudden stopping problem." The battery enclosure materials are rated to withstand vibration and improve shock resistance for the battery. The battery pack is designed to withstand shock, vibration, and impact under potential abuse cases, such as running the product into a wall.

As discussed, the battery pack storage enclosure 300 contains a set of aluminum pocket cores or at least pocket cores reinforced with metal mid plates and walls. The set of pocket cores with metal hold the battery cells in place and transfers inertial loads to the structure of the battery enclosure. The battery pack storage enclosure 300 contains aluminum pocket cores or at least pocket cores reinforced with metal mid plates and inserted reinforcement walls that form the structure of the battery pack. In addition, each battery cell itself fills the space of the pocket core to form a rigid well supported structure that protects against "mechanical damage." No individual battery cell or structure piece may be easily bend. The battery pack storage enclosure 300 uses the rigid distributed metal structure to disperse mechanical shock and vibration to the entire structure. In addition, the soft glues are placed in the pockets/cores between each battery cell and a frame of the pockets/cores to absorb vibrational energy. These can all combine to make the battery pack storage enclosure 300 both vibration resistant to stay in place during normal vehicle operations as well as shock resistant to not have battery cells fails during a sudden stopping accident.

Figure 7A:
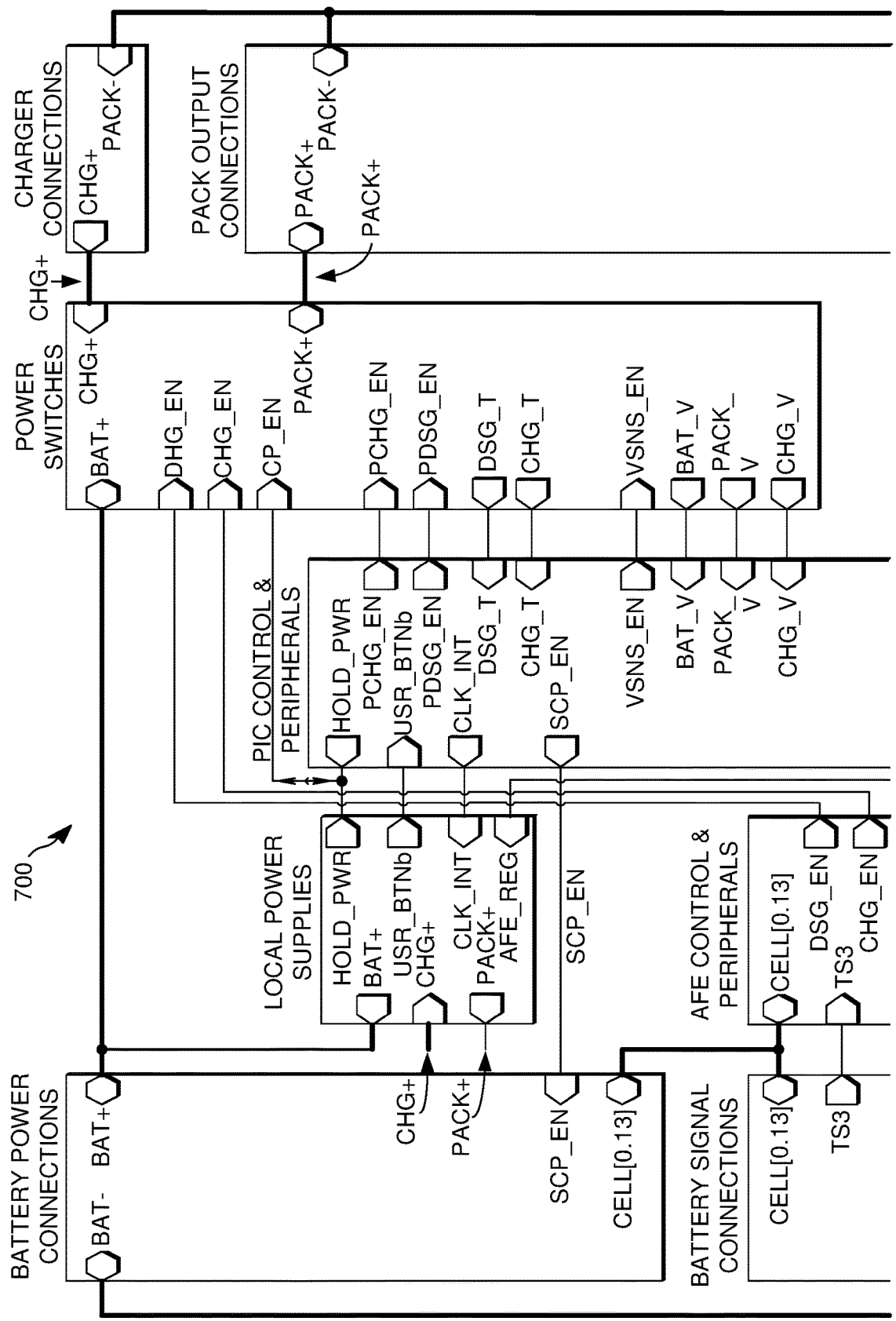
FIGS. 7A and 7B illustrates an example embodiment of a plurality of electrical taps coming from the battery pack storage enclosure.
Figure 7B:
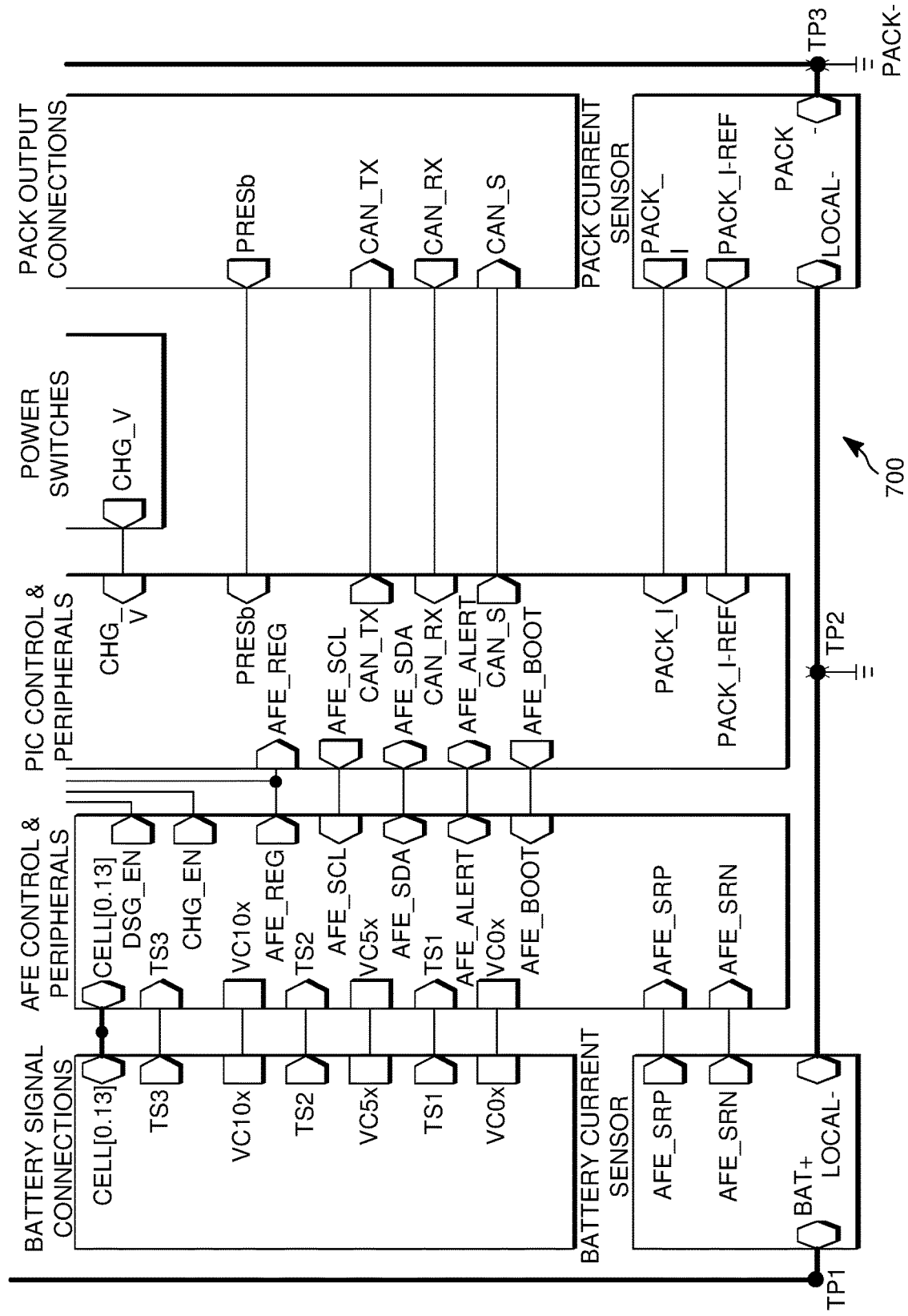

FIGS. 7A and 7B illustrates an example embodiment of a plurality of electrical taps coming from the battery pack storage enclosure. The sensing of battery parameters, via electrical taps 700, is used to detect early failure indications for the battery and/or optimization of the battery for extended use of the battery.

In an example, Z bend taps may be used to allow the battery cells to be welded onto the block and to connect to the metal of different parts of the battery enclosure. The Z bend taps replace soldering which is much more expensive. The Z bend taps can serve the dual purpose of providing a connection point/electrical tap to the battery and to allow a sensing of parameters on individual battery cells themselves. In an embodiment, the top and bottom battery cells in the battery pack series stack are connected to a Printed Circuit Board by directing soldering or spot welding the cell tabs onto exposed copper pads on the PCB: BAT+ and BAT−.

Figure 8:
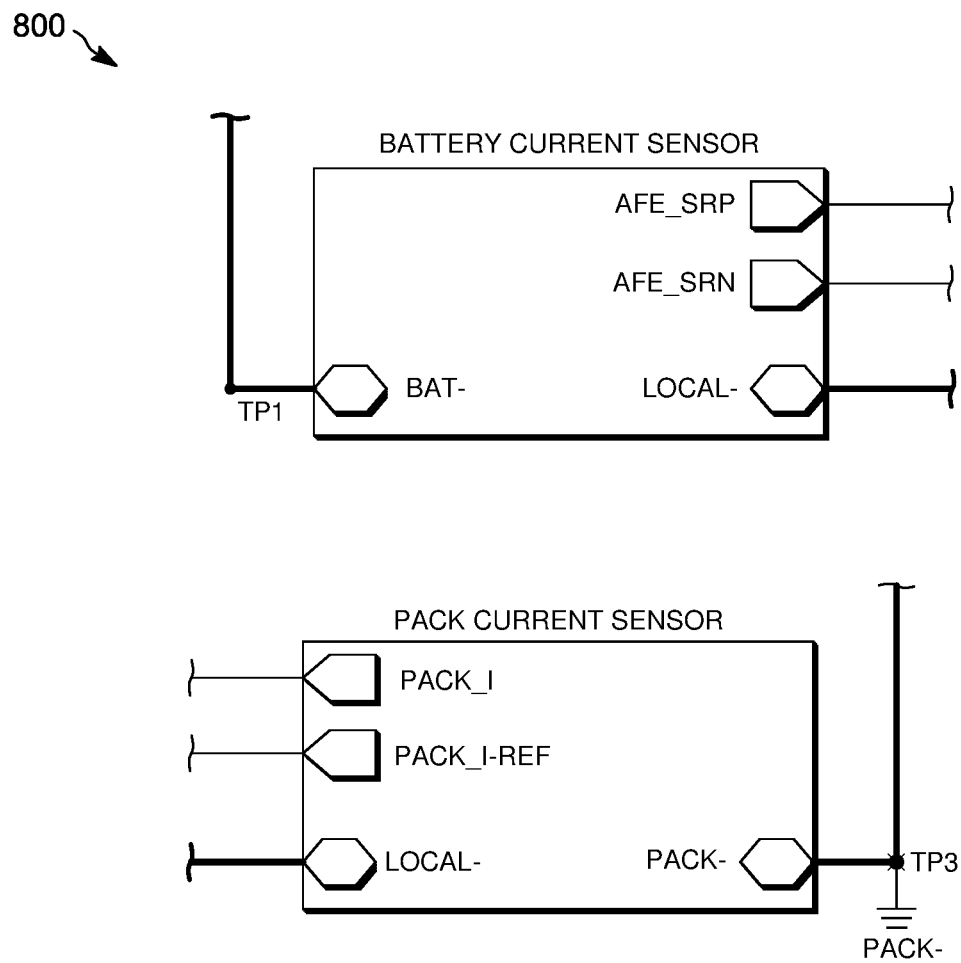
FIG. 8 illustrates an example embodiment of a plurality of electrical taps coming from the battery pack storage enclosure that feed both overall battery pack output parameters as well as individual battery cell parameters to electrical circuits.

FIG. 8 illustrates an example embodiment of a plurality of electrical taps coming from the battery pack storage enclosure that feed both overall battery pack output parameters as well as individual battery cell parameters to electrical circuits. The battery pack storage enclosure uses a plurality of electrical taps 800 that feed battery parameters to corresponding electrical circuits. These battery parameters sent to corresponding electrical circuits, detect early indications of potential dangerous conditions for the battery cells contained in the battery pack storage enclosure. In a first example of electrical taps 800 and conditions detected, two or more separate electrical current measurements are made from separate redundant sensing electrical circuits connecting to the electrical taps 800 that measure output electrical current from the battery pack, and then the results of those separate redundant electrical current measurements are sent to at least two different integrated circuits monitoring parameters of the battery pack (e.g. a local battery chip and an overall battery system microprocessor). See FIG. 9 for an example embodiment of a battery electrical current sensing circuit for the overall battery system microprocessor. See FIG. 10 for an example embodiment of the battery electrical current sensing circuit for the local battery chip. In an embodiment, a PIC chip may be an overall system microprocessor for all of the battery and a BQ chip manages low level measurements as a local domain controller for individual cells and individual portions of a battery pack. Thus, a first and a secondary electrical current sensor tap and electrical circuit are included for redundant fault monitoring.

Figure 9:
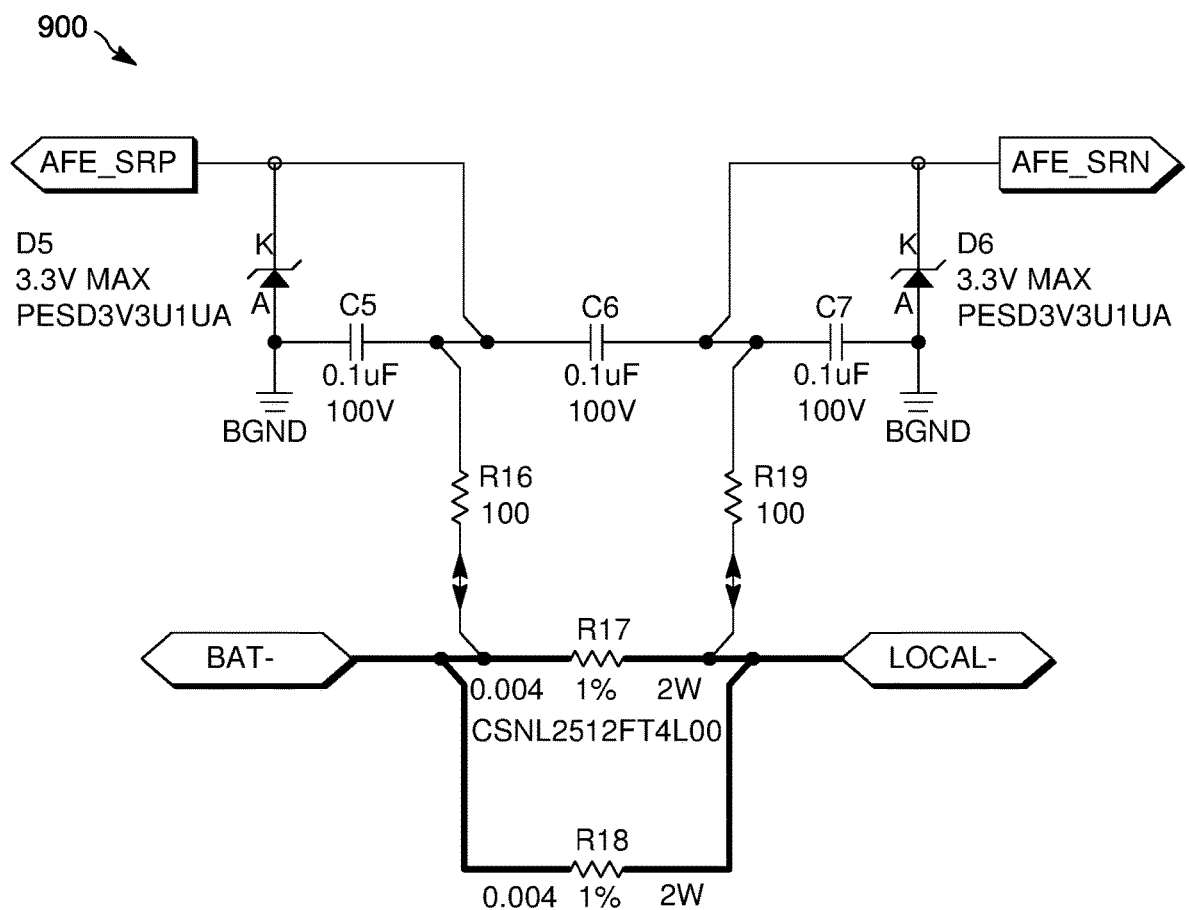
FIG. 9 illustrates an example embodiment of a battery electrical current sensing circuit.

FIG. 9 illustrates an example embodiment of a battery electrical current sensing circuit. The electrical current from the battery pack and local battery cells are supplied by this current sensing circuit 900 to the overall battery system microprocessor.

This is the low side current sensor located between the low side power connection to the battery cells and the monitoring chip. The current sensing electrical circuit 900 has two or more sense resistors electrically connected in parallel in order to spread out any heat produced from the resistors when a high amount of electrical current is coming from the output of the battery pack. This keeps both resistors in a lower operating temperature range. A sense resistor is placed at the output of the battery pack to distinguish local electrical current draws from electrical current into or out of the battery pack. The RC filter network on the current sense input provides attenuation to both differential and common-mode noise signals.

The circuit 900 can measure the voltage across a resistor to do Coulomb counting for battery capacity calculations. This sensor is also used for the overload current detection and short circuit detection discharge cutoff protections.

Figure 10:
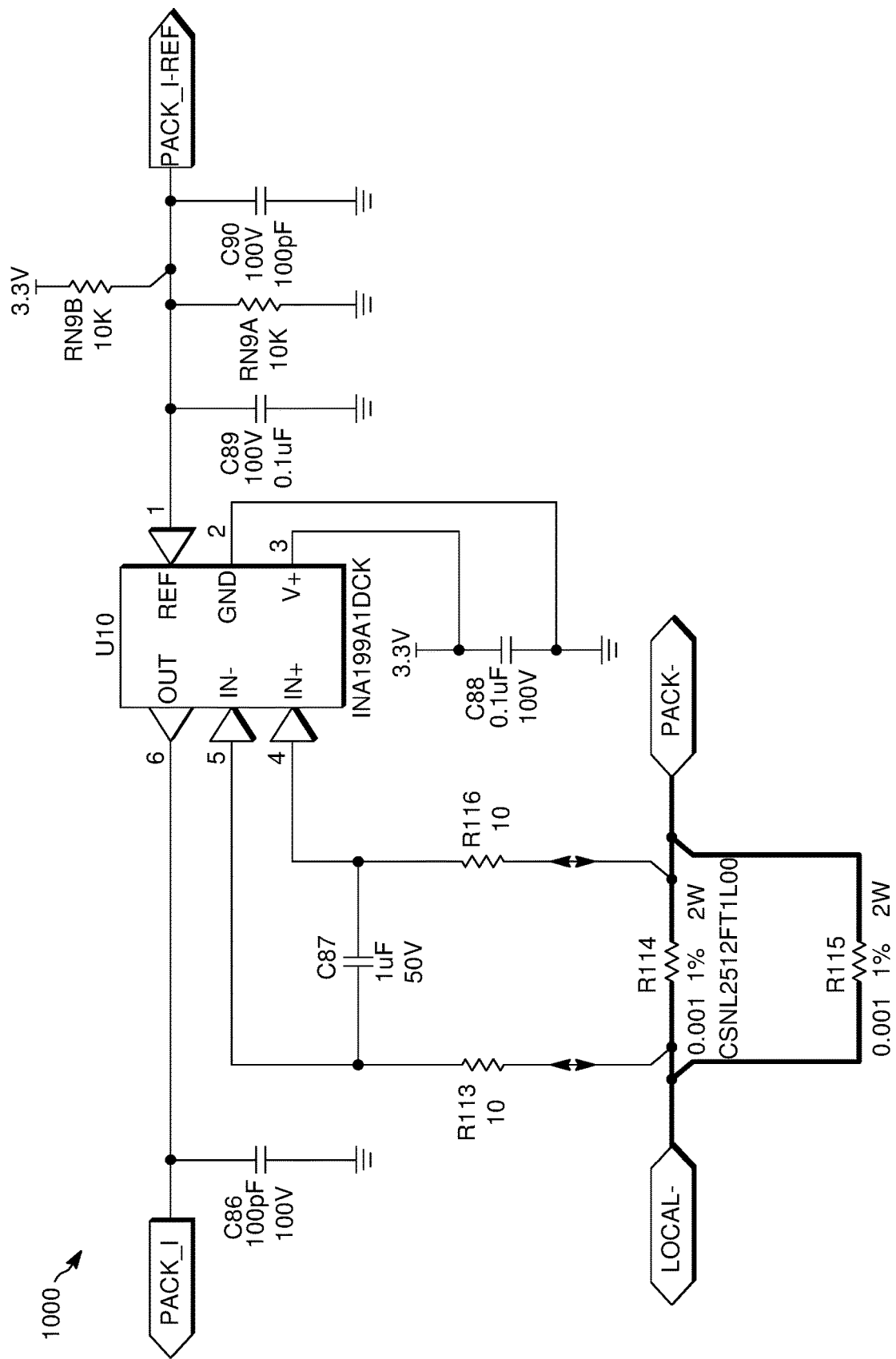
FIG. 10 illustrates an example embodiment of a battery electrical current sensing circuit for the local battery chip.

FIG. 10 illustrates an example embodiment of a battery electrical current sensing circuit for the local battery chip. The electrical current from the battery pack and local battery cells via this sensing circuit 1000 are supplied to the local battery chip.

The local battery pack current sensing circuit 1000 is the low side current sensor located between the local circuitry and the low side pack output (where the electrical ground is shared between the battery power output and the charger power connection). A bi-directional current sense amplifier is used to measure the voltage across the sense resistors and report the measurement to the local battery chip. This gives a redundant pack-level current sense measurement with which fault behavior may be defined. The current sensor also gives the local battery chip a fast direct current measurement (the current sense measurement returned from the overall battery system microprocessor gives averaged current over a period of 250 milliseconds).

The current sensor measurement range should be different than the maximum overload current cutoff level for the overall battery system microprocessor in order to use this circuit as a redundant check on the overcurrent protections for the overall battery system microprocessor.

The resistor/capacitor network between sense resistor and amplifier inputs filters the current measurement signal. The two sense resistors in parallel allows for a more common resistor value while maximizing dynamic range of the current sensor circuit. Note, the low side current sensing allows for a common mode voltage always near ground and isolates the current measurement from high voltage transients on output.

Figure 11:
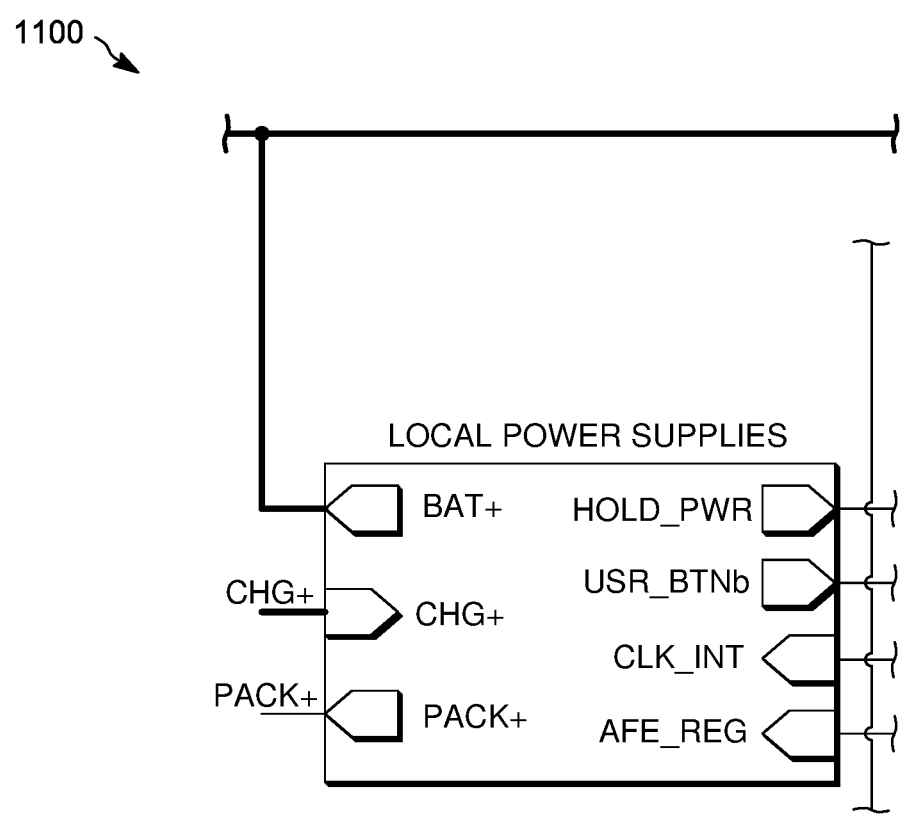
FIG. 11 illustrates an example embodiment of a plurality of electrical taps coming from the battery pack storage enclosure that feed parameters to compare 1) the actual resistance to 2) an expected amount of resistance for that battery cell during a charging of that battery cell.

FIG. 11 illustrates an example embodiment of a plurality of electrical taps coming from the battery pack storage enclosure that feed parameters to compare 1) the actual resistance to 2) an expected amount of resistance for that battery cell during a charging of that battery cell. The parameters sensed may be, for example, individual battery cell values, input voltage charging values, and battery pack output voltage. Three separate measurements of output battery cell voltage, input voltage from the charger, and output entire battery pack voltage, and comparisons between the three voltages are used by the circuit 1100 to detect electrical current path failures. The system estimate every cell's resistance during charging.

Referring to FIGS. 7A, 7B, and 11, a plurality of electrical taps and their electrical circuit sense battery parameters for the battery cells contained in the battery pack storage enclosure. A first sensing electrical circuit connects to the electrical taps that measure actual resistance of the battery cell, as indicated by a resistance or voltage amount of that battery cell. A comparator then compares 1) the actual resistance to 2) an expected amount of resistance for that battery cell during a charging of that battery cell, and when a deviation greater than a set threshold amount exists, the comparator communicates that a potentially damaging condition exists. The chip receives the current resistance measurements of the battery cells compared to an expected resistance amount during charging and determines what to do when a deviation exists between the current resistance measurements of battery cells compared to an expected resistance amount.

Battery cell resistance can be measured by looking at battery cell voltage before (v_before) and after (v_after), as well as the current before (I_before) and after (I_after). Cell_R=(V_after−V_before)/(I_after−I_before). Only while time t before and after is small (t_after−t_before <~seconds). This is to ensure the battery cell voltage does not change due to actual SOC change.

There can be two key states used for calculating battery cell resistance: Monitoring and Measuring. This is because the system needs to measure the voltage across cells before and after applying a known current to the cells.

Monitoring: The system wants to ensure voltage is stable (not varying) in this state. Voltage may be varying due to relaxing from previous hard charge/discharge and may have developed over potential, skewing results. If this is the case, the system does not want to proceed with the estimate.

Measuring: This state checks the voltage after the charger voltage has been applied and sufficient current is flowing. It checks at least two samples for consistency in voltage levels, as the system may have measured on a charger transition.

Battery cell resistance estimates are stored for each battery cell in a memory. Initial known good starting estimates are populated in memory for a new battery pack.

Per-boot resistance delta: Battery cell resistance is slow changing. The system reflects this fact by imposing a limit on how much the battery cell resistance can change in a single boot cycle. This will limit any abnormal conditions throwing off estimates. Furthermore, it will act somewhat like a low pass filter.

Note, since the example electric powered skateboard is an example 4-wheeled personal transportation vehicle, it can be ridden with or without power. The personal transportation vehicle can still be ridden even if the electronics stop working. The personal transportation vehicle's behaviors have been designed to disengage (electrically) the propulsion system in the unlikely event of loss of power or loss of communications. This is done so gradually and steadily to mitigate against any risks to the user riding on the personal transportation vehicle. The chip tries to identify potential dangerous or error conditions and appropriate corrective actions.

The battery management system (BMS) has been designed to protect against electrical or thermal abuse of the cells. The BMS has redundant temperature, voltage, and current measurements to prevent damage to cells. Furthermore, the BMS can measure all battery cell voltages and balance cells both during charging and other times while operating, all tempered by specified limits. The BMS has redundant protection levels for both charge and discharge to detect and prevent abuse to the battery cells through undervoltage or overvoltage conditions.

The system protects against external shorting, incorrect charge voltages/currents, electro-static discharge (ESD) damage, and prevents operations outside of acceptable temperature ranges (per battery cell spec). A Battery Failure decoder via measurements can correlate measurement anomalies to possible error conditions. The measurement anomalies to possible error conditions such as Battery cell Voltage High, Battery cell Voltage low, Battery Voltage High, Battery Voltage low, Discharge Voltage high, Charger Voltage High, Battery cell Voltage imbalance high, Safety Critical Measurement delta, Pack (MD) voltage failed to rise to battery voltage, etc.

During operation of the vehicle, the movement of the vehicle can charge the battery. In addition, a LEV charger dock may charge the battery when the vehicle is not moving. The electrical charger dock is configured to allow faster charging of the electric batteries at a higher voltage level and current rate because the charger dock plugs directly into the wall. The charger dock makes an electrical connection with the battery and allows for charging at high speed. The electrical charger dock allows the LEV to be, in general, always at the ready and facilitates fast charging. The act of removing the LEV from the charger powers on the system and/or puts it in a ready to use state. This may include powering on the remote. The single action of removing the LEV from its charger dock puts the unit in a ready to ride state saving the user time and minimizing action required to start using the LEV. The electrical charger dock minimizes user downtime and improves ease of use of LEV. Note, also a wireless charging unit can also be coupled to the battery circuit. In addition, a car charger adapter is configured to allow the battery circuit to electrically mate up with a standard electric car charger station. The standard electric car charger station can connect up to and charge the battery of the personal transportation vehicle.

Again, the parameters sensed may be, for example, individual battery cell values, input voltage charging values, and battery pack output voltage.

The plurality of electrical taps and electrical circuits may sense battery parameters for the battery cells contained in the battery pack storage enclosure. The multiple sensing electrical circuits connect to the electrical taps that measure at least voltage levels on i) individual battery cells as well as ii) an output voltage of the battery pack in general, then communicate those parameters to the motor driver circuit in order to substantially match i) charging voltage and electrical current to ii) battery output voltage and electrical current in order to allow optimal performance of the battery cells for extended use.

The battery pack may be optimized for extended performance or improved performance such as changes for starting, stopping, going uphill, going downhill, undercharging the battery to allow for some regenerative braking, etc.

Extra spikes of energy can be needed from the battery during certain conditions such as going uphill by limiting the rate of initial charge into or out of the battery pack.

Motor controller—The system monitors what is happening on individual cells as well as in the battery pack in general, and then communicates those parameters to the motor driver. Based on capacity and current battery cell temperatures or voltage outputs, the motor driver then adjusts a performance range for the motor. The motor driver also then initiates the sending of notices to user to allow user to know what type of performance out of the motor is currently possible.

The system may continually try to match charging voltage and current and battery output voltage and current to allow optimal performance of the battery for extended use. In some situations, the motor driver generates electrical current into the battery when braking for the vehicle. The system monitors the state of the battery cells to see if the system can put that electrical current into the battery cells or if the system needs to divert the excess electrical current into a separate heat dump.

An example embodiment of an electric-powered personal transportation vehicle can use the trucks as a heat sink for removing heat from the electrical components. The brakes use regenerative braking. The resistive heat dump into the mass of the truck allows for braking downhill on a full battery without causing overcharge or loss of the brakes. Also, removing heat from various electrical components in the system can assist the breaks to working longer and better. Also, putting heat from the brakes into the battery can allow the battery absorb more energy and more power. Electrical energy generated through regenerative braking may also be dissipated in a resistive element placed in the deck, covers, wheels, motors, or any other element of the skateboard that has the capacity to dissipate heat. The energy may also be dissipated through lights or other systems that consume electrical energy. Energy may be dissipated as it is generated from the motors or at a later time if stored temporarily in the battery or other energy storage element such as a capacitor.

Motor Control

The electric-powered skateboard starting and stopping power supplied to the motor is optimized. The optimization extends to its battery to support the corresponding spikes of electrical current from the battery during an initial starting and any rapid braking. The improved dynamic range of batteries can be achieved via a battery controller and use of the regenerative breaking. A first algorithm may be tuned specifically for, for example, a three pound main battery to move a 180 pound rider on the board with a smooth acceleration and deceleration. Large peaks in current and voltage may temporarily exceed manufacturer stated limits of a cell in the battery, but control algorithms designed into the motor and battery control systems may make this a safe and acceptable action. Timing of power spikes, control of battery temperature, and selective routing of electrical energy to other components in the electric-powered skateboard all may be used to improve the overall acceleration and braking experience while allowing the battery to operate safely. A voltage or current mode control and control algorithm may be used to modulate electrical current spikes to get peak performance.

The controller may dynamically control power supplied to the electric motor(s) for the electric-powered skateboard. The controller may determine one or more user parameters via sensors, a user input value from a rider, and a combination of both. The controller may select a first electrical current output value based on the user input value and/or sensors from an input map. The controller may control power provisioned to the electric motor(s) to maintain an output current within a predetermined range of the first current output value. The controller may via one or more sensors detect a condition indicative of perturbation. The controller may then select a second electrical current output value for the first user input value based on the user parameter(s). The controller may in response to detecting the condition indicative of perturbation, control power provision to the electric motor to maintain the output current within a second predetermined range of the second current output value. The controller may then incrementally adjust an electrical current output value mapped to the first user input value from the second current output value to the first current output value. The controller will control power provisioning to the electric motor to maintain the output electrical current within a predetermined range of each adjusted current output value.

An example embodiment of an electric-powered personal transportation vehicle is optimized to maintain momentum uphill and fast, responsive braking downhill. The trucks are optimized for the torque and power of the electric drivetrain along with structurally strong enough to withstand thousands of miles of use through rough and sometimes uneven terrain. The motor(s) are optimized to make a rider's uphill battle a breeze on the skateboard. Depending on the mode, the rider simply applies the brakes to maintain downhill momentum or quickly stop mid descent. You never shy away from a daunting hill again! The electric drivetrain is configured to race up steep inclines with smooth, responsive acceleration. The electric drivetrain and battery combine to give access up to 4 times the power that elite bicycle riders generate when climbing a mountain. In addition, the powerful regenerative braking system allows the rider to come to a stop confidently, even while turning or going down a hill. The electric drivetrain and battery combine to give 25% grade hill climbing, 22 mph top speed, and regenerative braking without overheating to climb any hill, stop any time, and cruise over any terrain with the board's smooth braking and powerful electric motors.

Web Site

The web site is configured as a browser-based tool or direct cooperating app tool for configuring, analyzing, and communicating with the electric personal transportation vehicle.

A diagnostic App and an Artificial Intelligence Program

A diagnostic app and an artificial intelligence program are configured to give feedback and adjust various settings on the skateboard, such as maintenance reminders and diagnostics. For example, maintenance indicators can be provided to a user automatically through an app on the smart phone. Likewise, automated diagnostics can be made by the artificial intelligence program by analyzing parameters, such as audio, images, mileage, and video processing, to determine recommended maintenance for the board. Thus, an app on a smart phone can record the sounds of the wheels and the motor and the belt drive system to determine recommended maintenance for the board. The app on the smart phone or the backend server can then analyze the captured sound and perform a diagnostic on that sound to determine what issues/problems that the board currently has and provide feedback to the user on what to do, such as change the belts, etc.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first electric personal transportation vehicle, a second electric personal transportation vehicle, and the like. The client computing system can include, for example, the software application or the hardware-based system that may be able to exchange communications with the first electric personal transportation vehicle, and/or the second electric personal transportation vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database. A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

It should be noted that the present design can be carried out on a computing system. However, the present design can be carried out on a server, a computing device devoted to message handling, or on a distributed system in which different portions of the present design are carried out on different parts of the distributed computing system.

Another device that may be coupled to bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory, machine-readable medium. A machine-readable medium includes any mechanism that stores information in a form readable by a machine (e.g., a computer). For example, a non-transitory, machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
an electric powered personal transportation vehicle, with one or more wheels driven by one or more electric motors, where the electric motors are powered by one or more batteries; and
where a first battery pack storage enclosure i) contains a. set of pocket cores, where the first battery pack storage enclosure has a rigid internal structure that has the set of pocket cores that hold the battery cells in place and ii) contains a metal mid-plate that functionally transfers thermal heat rapidly through a metal mass of the metal mid-plate to smooth out spikes of local temperatures when an initial battery cell overheats and fails in order to minimize the heat from the initial battery cell failure from propagating and causing a. neighboring battery cell to also fail from the heat.

2. The apparatus of claim I, where each pocket core of the battery pack storage enclosure is made of glass filled nylon to absorb impact, and a die cast aluminum metal mid-plate to thermally conduct heat rapidly.

3. The apparatus of claim 1, where the battery pack storage enclosure also contains multiple metal walls inserted into a structure of the battery pack storage enclosure, where the battery pack storage enclosure contains a first metal wail abutting in between neighboring pocket cores to prevent sideways thermal heating from directly overheating neighbor battery cells and functionally transferring thermal heat rapidly through a metal mass of that metal wall to smooth out spikes of local temperatures when an initial battery cell overheats.

4. The apparatus of claim 3. where each battery cell has an insulation wrapper wrapping around that battery cell to limit a heat transfer rate between the pocket core holding that battery cell and the battery cell itself, where the insulation wrapper to limit the heat transfer rate allows the heat from a venting battery cell to have more time to evenly disperse an intense heat from the venting gases throughout an entire battery pack storage enclosure including the metal mid plates, the metal walls, and the multiple pocket cores each with its own battery cell making up the battery pack storage enclosure; rather than, locally rapidly transferring that intense heat from one venting battery cell to merely its neighbor battery cell and then that intense local heat damaging its neighboring battery cell.

5. The apparatus of claim 1, where each of the pocket cores has one or more blowout buttons/covers on that pocket core containing the battery cell, where the blowout buttons/covers on that pocket core assist to keep water, moisture, and dirt away from a housed battery cell in that pocket core; and in addition, when an overheating failure occurs on that battery cell, then the blowout cover far that battery cell allows hot vent gases to exit the overheating battery cell and minimally affect neighboring battery cells because the remaining pocket cores still maintain their individual blowout covers; and thus, are shielded by those remaining blowout covers from the hot vent gases from the overheating battery cell.

6. The apparatus of claim 1, where each of the pocket cores has a battery cell with soft glue holding that battery cell in place in the pocket core, where the battery pack storage enclosure with i) its cavities in the pocket cores filled with battery cells and soft glue, ii) the metal mid-plates, and iii) metal walls form a rigid structure 1) resistant to vibration effects from anticipated operation of the person transportation vehicle as well as 2) resistant to sudden impact shocks to the structure from being dropped and/or a sudden stopping of the person transportation vehicle when a crash occurs, where the use of soft glue assists in absorbing vibrational energy and momentum energy while holding the battery cell in place.

7. The apparatus of claim 1, further comprising:
two or more tie rods that run through the battery pack storage enclosure to increase rigidity of the battery pack storage enclosure, which improves a vibration and shock. resistance for the battery cells housed in the pocket cores of the enclosure, where a first and a. second tie rods extend to also functionally tie multiple groups of battery cells together when secured with one or more fastening devices into a unitary rigid battery module.

8. The apparatus of claim I. further comprising:
a plurality of electrical taps and electrical circuits to sense battery parameters to detect early indications of potential dangerous conditions for the battery cells contained in the battery pack storage enclosure, where two or more separate electrical current measurements are made from separate redundant sensing electrical circuits connecting to the electrical taps that measure output electrical current from the battery pack, and then the results of those separate redundant electrical current measurements are sent to at least two different integrated circuits monitoring parameters of the battery pack, where each sensing electrical circuit has two or more sense resistors electrically connected in parallel in order to spread out any heat produced from the resistors.

9. The apparatus of claim 1, further comprising:
a plurality of electrical taps and electrical circuits to sense battery parameters for the battery cells contained in the battery pack storage enclosure, where a first sensing electrical circuit connects to the electrical taps that measure actual resistance of the battery cell, as indicated by a resistance or voltage amount of that battery cell, where a comparator then compares 1) the actual resistance to 2) an expected amount of resistance for that battery cell during a charging of that battery cell, and when a deviation greater than a set threshold amount exists, the comparator communicates that a potentially damaging condition exists.

10. The apparatus of claim 1, further comprising:
a plurality of electrical taps and electrical circuits to sense battery parameters for the battery cells contained in the battery pack storage enclosure, where multiple sensing electrical circuit connect to the electrical taps that measure at least voltage levels on i) individual battery cells as well as ii) an output voltage of the battery pack in general, then communicate those parameters to the motor driver circuit in order to substantially match i) charging voltage and electrical current to ii) battery output voltage and electrical current in order to allow optimal performance of the battery cells for extended use.

11. A method for an electric powered personal transportation vehicle, comprising:
constructing the electric powered personal transportation vehicle, with one or more wheels driven by one or more electric motors, where the electric motors are powered by one or more batteries; and
constructing a first battery pack storage enclosure that i) contains a set of pocket cores, where the first battery pack storage enclosure has a rigid internal structure that has the set of pocket cores that hold the battery cells in place and ii) contains a metal mid-plate that functionally transfers thermal heat rapidly through a metal mass of the metal mid-plate to smooth out spikes of local temperatures when an initial battery cell overheats and fails in order to minimize the heat from the initial battery cell failure from propagating and causing a neighboring battery cell to also fail from the heat.

12. The method of claim 11, further comprising:
making each pocket core of the battery pack storage enclosure with glass filled nylon to absorb impact, and a die cast aluminum metal mid-plate to thermally conduct heat rapidly.

13. The method of claim 11, further comprising:
making the battery pack storage enclosure to also contain multiple metal walls that are inserted into a structure of the battery pack storage enclosure, where the battery pack storage enclosure contains a first metal wall abutting in between neighboring pocket cores to prevent sideways thermal heating from directly overheating neighbor battery cells and functionally transferring thermal heat rapidly through a metal mass of that metal wall to smooth out spikes of local temperatures when an initial battery cell overheats.

14. The method of claim 13, where each battery cell has an insulation wrapper wrapping around that battery cell to limit a heat transfer rate between the pocket core holding that battery cell and the battery cell itself, where the insulation wrapper to limit the heat transfer rate allows the heat from a venting battery cell to have more time to evenly disperse an intense heat from the venting gases throughout an entire battery pack storage enclosure including the metal mid plates, the metal walls, and the multiple pocket cores each with its own battery cell making up the battery pack storage enclosure; rather than, locally rapidly transferring that intense heat from one venting battery cell to merely its neighbor battery cell and then that intense local heat damaging its neighboring battery cell.

15. The method of claim 11, further comprising:
making each of the pocket cores to have one or more blowout buttons/covers on that pocket core containing the battery cell, where the blowout buttons/covers on that pocket core assist to keep water, moisture, and dirt away from a housed battery cell in that pocket core; and
in addition, when an overheating failure occurs on that battery cell, then the blowout cover for that battery cell allows hot vent gases to exit the overheating battery cell and minimally affect neighboring battery cells because the remaining pocket cores still maintain their individual blowout covers; and thus, are shielded by those remaining blowout covers from the hot vent gases from the overheating battery cell.

16. The method of claim 11, further comprising:
making each of the pocket cores have its own battery cell with soft glue holding that battery cell in place in the pocket core, where the battery pack storage enclosure with i) its cavities in the pocket cores filled with battery cells and soft glue, ii) the metal mid-plates, and iii) metal walls form a rigid structure 1) resistant to vibration effects from anticipated operation of the person transportation vehicle as well as 2) resistant to sudden impact shocks to the structure from being dropped and/or a sudden stopping of the person transportation vehicle when a crash occurs, where the use of soft glue assists in absorbing vibrational energy and momentum energy while holding the battery cell in place.

17. The method of claim 11, further comprising:
using two or more tie rods that run through the battery pack storage enclosure to increase rigidity of the battery pack storage enclosure, which improves a vibration and shock resistance for the battery cells housed in the pocket cores of the enclosure, where a first and a second tie rods extend to also functionally tie multiple groups of battery cells together when secured with one or more fastening devices into a unitary rigid battery module.

18. The method of claim 11, further comprising:
making a plurality of electrical taps and electrical circuits to sense battery parameters to detect early indications of potential dangerous conditions for the battery cells contained in the battery pack storage enclosure, where two or more separate electrical current measurements are made from separate redundant sensing electrical circuits connecting to the electrical taps that measure output electrical current from the battery pack, and then the results of those separate redundant electrical current measurements are sent to at least two different integrated circuits monitoring parameters of the battery pack, where each sensing electrical circuit has two or more sense resistors electrically connected in parallel in order to spread out any heat produced from the resistors.

19. The method of claim 11, further comprising:
making a plurality of electrical taps and electrical circuits to sense battery parameters for the battery cells contained in the battery pack storage enclosure, where a first sensing electrical circuit connects to the electrical taps that measure actual. resistance of the battery cell, as indicated by a resistance or voltage amount of that battery cell, where a comparator then. compares 1) the actual resistance to 2) an expected amount of resistance for that battery cell during a charging of that battery cell, and when a deviation greater than a set threshold amount exists, the comparator communicates that a potentially damaging condition exists.

20. The method of claim 11, further comprising:
making a plurality of electrical taps and electrical circuits to sense battery parameters for the battery cells contained in the battery pack storage enclosure, where multiple sensing electrical circuit connect to the electrical taps that measure at least voltage levels on i) individual battery cells as well as ii) an output voltage of the battery pack in general, then communicate those parameters to the motor driver circuit in order to substantially match i) charging voltage and electrical current to ii) battery output voltage and electrical current in order to allow optimal performance of the battery cells for extended use.

* * * * *